US009918288B2

(12) United States Patent
Silva et al.

(10) Patent No.: US 9,918,288 B2
(45) Date of Patent: Mar. 13, 2018

(54) METHODS, NODES AND USER EQUIPMENTS FOR FINDING NEIGHBORING USER EQUIPMENTS WITH WHICH A FIRST USER EQUIPMENT MAY BE ABLE TO COMMUNICATE DIRECTLY

(71) Applicant: Telefonaktiebolaget LM Ericsson (publ), Stockholm (SE)

(72) Inventors: Carlos F. M. Silva, Fortaleza (BR); Rodrigo Lopes Batista, Fortaleza (BR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/320,563

(22) PCT Filed: Jul. 1, 2014

(86) PCT No.: PCT/SE2014/050827
§ 371 (c)(1),
(2) Date: Dec. 20, 2016

(87) PCT Pub. No.: WO2016/003333
PCT Pub. Date: Jan. 7, 2016

(65) Prior Publication Data
US 2017/0164304 A1   Jun. 8, 2017

(51) Int. Cl.
*H04B 7/00* (2006.01)
*H04W 52/38* (2009.01)
(Continued)

(52) U.S. Cl.
CPC .......... *H04W 52/383* (2013.01); *H04L 12/28* (2013.01); *H04W 8/005* (2013.01); *H04W 52/0209* (2013.01); *H04W 76/02* (2013.01)

(58) Field of Classification Search
CPC .......... H04L 12/28; H04W 52/0209; H04W 52/383; H04W 76/02; H04W 8/005
(Continued)

(56) References Cited

U.S. PATENT DOCUMENTS

2005/0282547 A1* 12/2005 Kim ................. H04W 36/0055
455/436
2007/0110000 A1* 5/2007 Abedi ..................... H04L 47/14
370/332
(Continued)

FOREIGN PATENT DOCUMENTS

WO     2012/152224 A1    11/2012

OTHER PUBLICATIONS

Cheng, Huang et al., "Clustering algorithms research for device-clustering localization", 2012 International Conference on Indoor Positioning and Indoor Navigation, Nov. 13-15, 2012, XP032313194, 13 pages.
(Continued)

*Primary Examiner* — Tan H Trinh
(74) *Attorney, Agent, or Firm* — Rothwell, Figg, Ernst & Manbeck, P.C.

(57) ABSTRACT

Disclosed is a method performed by a system of network nodes in a wireless communication network, for finding neighboring user equipments, UEs, with which a first UE (121) may be able to communicate directly. The system of network nodes includes a first base station, BS, (111), and the first UE is wirelessly connected to the first BS. The method comprises receiving, from a plurality of UEs (122, 123, 124, 125) wirelessly connected to the first BS (111) and from the first UE (121), power measurements performed on signals received from neighboring BSs (112, 113, 114, 115). The method further comprises determining (204) correlation values between the power measurements received from the
(Continued)

first UE and the power measurements received from individual of the plurality of UEs by comparing a level of the power measurements of the first UE and a level of the power measurements of individual of the plurality of UEs, which power measurements are performed on signals received from the same neighboring BS, and, based on the determined correlation values, determining neighboring UEs for the first UE, out of the plurality of UEs, and sending identities, IDs, of the determined neighboring UEs to the first UE.

20 Claims, 7 Drawing Sheets

(51) Int. Cl.
*H04L 12/28* (2006.01)
*H04W 8/00* (2009.01)
*H04W 52/02* (2009.01)
*H04W 76/02* (2009.01)

(58) Field of Classification Search
USPC ............ 455/41.1, 41.2, 434, 411, 436, 501; 709/204; 370/328, 329, 221, 241, 330, 370/311, 336, 277, 254, 331, 338
See application file for complete search history.

(56) References Cited

U.S. PATENT DOCUMENTS

| | | | |
|---|---|---|---|
| 2007/0195721 A1* | 8/2007 | Backes | H04L 47/125 370/310 |
| 2008/0205340 A1* | 8/2008 | Meylan | H04W 48/18 370/331 |
| 2011/0235598 A1* | 9/2011 | Hilborn | H04W 52/143 370/329 |
| 2012/0250551 A1* | 10/2012 | Sartori | H04W 48/12 370/252 |
| 2012/0290650 A1* | 11/2012 | Montuno | H04W 4/008 709/204 |
| 2013/0170470 A1* | 7/2013 | Kneckt | H04W 72/0446 370/330 |
| 2013/0336230 A1 | 12/2013 | Zou et al. | |
| 2013/0343321 A1* | 12/2013 | Nordstrom | H04W 72/085 370/329 |
| 2014/0010172 A1* | 1/2014 | Wei | H04W 76/023 370/329 |
| 2014/0051357 A1* | 2/2014 | Steer | H04L 63/0876 455/41.2 |
| 2014/0161054 A1 | 6/2014 | Sandberg et al. | |
| 2014/0169234 A1* | 6/2014 | Zhu | H04W 72/082 370/277 |
| 2014/0169244 A1* | 6/2014 | Polisetty | G06F 17/30864 370/311 |
| 2014/0199969 A1* | 7/2014 | Johnsson | H04W 56/00 455/411 |
| 2014/0256334 A1* | 9/2014 | Kazmi | H04W 28/18 455/450 |
| 2014/0355483 A1* | 12/2014 | Jang | H04W 8/26 370/254 |
| 2015/0056987 A1* | 2/2015 | Li | H04W 76/023 455/434 |
| 2015/0063095 A1* | 3/2015 | Deng | H04W 8/005 370/221 |
| 2015/0230168 A1* | 8/2015 | Sawai | H04W 48/20 370/254 |
| 2015/0264607 A1* | 9/2015 | Chaudhuri | H04W 36/0061 455/436 |
| 2015/0270882 A1* | 9/2015 | Shattil | H04B 1/0003 370/329 |
| 2015/0365868 A1* | 12/2015 | Chang | H04W 48/18 370/230 |
| 2016/0065362 A1* | 3/2016 | Choyi | H04L 63/065 380/279 |
| 2017/0094673 A1* | 3/2017 | Jitsukawa | H04W 72/082 |

OTHER PUBLICATIONS

International Search Report and Written Opinion issued in corresponding International application No. PCT/SE2014/050827, dated Jan. 7, 2016, 13 pages.

Fodor, Gábor et al., "Design Aspects of Network Assisted Device-to-Device Communications," IEEE Communications Magazine, Mar. 2012, pp. 170-177.

Felemban, Emad et al. "SAND: Sectored-Antenna Neighbor Discovery Protocol for Wireless Networks," IEEE, IEEE Secon 2010 proceedings, ISBN: 978-1-4244-7151-5, 2010, 9 pages.

Zhang, Lei and Dongning Guo "Neighbor Discovery in Wireless Networks Using Compressed Sensing with Reed-Muller Codes," 2011 International Symposium of Modeling and Optimization of Mobile, Ad Hoc, and Wireless Networks, ISBN: 978-1-61284-824-2, 2011, pp. 154-160.

Vasudevan, Sudarshan et al., "Neighbor Discovery in Wireless Networks and the Coupon Collector's Problem," MobiCom'09, Sep. 20-25, 2009, 12 pages.

Doppler, Klaus et al., "Advances in D2D Communications: Energy efficient Service and Device Discovery Radio," IEEE, ISBN: 978-1-4577-0787-2, 2011, 6 pages.

You, Lizhao et al., "ALOHA-Like Neighbor Discovery in Low-Duty-Cycle Wireless Sensor Networks," IEEE WCNC 2011—Network, ISBN: 978-1-61284-254-7, pp. 749-754.

Hong, Jongwoo et al., "Analysis of Device-to-Device Discovery and Link Setup in LTE Networks," 2013 IEEE 24th International Symposium on Personal, Indoor and Mobile Radio Communications: Mobile and Wireless Networks, ISBN: 978-1-4577-1348-4, 2013, pp. 2856-2860.

Becvar, Zdenek, "Optimization of SINR-based Neighbor Cell List for Networks with Small Cells," 2013 IEEE 24th International Symposium on Personal, Indoor and Mobile Radio Communications: Mobile and Wireless Networks, ISBN: 978-1-4577-1348-4, 2013, pp. 2346-2351.

* cited by examiner ures of the first UE and a level of the power measurements of individual of the plurality of UEs, which power measurements are performed on signals received from the same neighboring BS. Said memory further contains instructions executable by said processor, whereby the system is operative for, based on the determined correlation values, determining neighboring UEs for the first UE, out of the plurality of UEs, and sending IDs of the determined neighboring UEs to the first UE.

According to another aspect, a UE is provided operable in a wireless communication network including a first BS, the UE being wirelessly connected to the first BS. The UE comprises a processor and a memory, said memory contain-

METHODS, NODES AND USER EQUIPMENTS FOR FINDING NEIGHBORING USER EQUIPMENTS WITH WHICH A FIRST USER EQUIPMENT MAY BE ABLE TO COMMUNICATE DIRECTLY

CROSS REFERENCE TO RELATED APPLICATION(S)

This application is a 35 U.S.C. §371 National Phase Entry Application from PCT/SE2014/050827, filed Jul. 1, 2014, designating the United States, the disclosure of which is incorporated by reference.

TECHNICAL FIELD

The present disclosure relates generally to methods, network nodes, user equipments, UEs, and computer programs in a wireless communication system, for finding neighboring UEs with which a first UE may be able to communicate directly, so called device-to-device, D2D, communication, in a wireless communication system.

BACKGROUND

When D2D communication is enabled in a wireless communication system, it is required for each D2D-capable UE to find its neighbors, i.e. other D2D-capable UEs in close physical proximity, with whom it can communicate directly. The wireless communication system may be e.g. a Wireless Local Area Network, WLAN, or a cellular system such as Wideband Code Division Multiple Access, W-CDMA, or Long Term Evolution, LTE.

There are prior art methods for a D2D-capable UE to find its neighbors. In one type of method, as described in the published patent applications US20130170470 and WO2012170794, a so called decentralized beaconing mechanism is described where a first D2D-capable UE sends a beacon signal for other D2D-capable UEs to respond to. Based on the received signal strength of signals sent from the other D2D-capable UEs in response to the sent beacon signal, the first D2D-capable UE may calculate which of the other UEs that is the best for D2D communication.

A problem with such methods is the time it takes to discover the D2D-capable UEs. If this discovery process would take too long, it may be useless, since no time is left for data transmission, and the neighboring UEs and the first UE may have moved since the discovery process started. Also, good stopping criteria for stopping such a discovery process are difficult to effectively define, especially since the surrounding environment is unknown and in an area around the first UE there may be everything from only a few UEs to a large number of UEs.

Another problem with such a method is the high consumption of battery power for the UEs. This is especially a problem if the amount of possible neighboring UEs is large. Further, an exchanging protocol has to be defined between the D2D-enabled UEs to make them react on each other's beaconing signals. This also implies that more network signaling will take place in the network. There is also an increased risk of a security attack if a UE that fakes its ID sends and receives beaconing signals to from other D2D-enabled UEs.

Consequently, there is a need for an improved mechanism for a first D2D-enabled UE to discover neighboring D2D-enabled UEs.

SUMMARY

It is an object of the invention to address at least some of the problems and issues outlined above. It is possible to achieve these objects and others by using a method and an apparatus as defined in the attached independent claims.

According to one aspect, a method is provided performed by a system of network nodes in a wireless communication network, for finding neighboring UEs with which a first UE may be able to communicate directly. The system of network nodes includes a first base station, BS, and the first UE is wirelessly connected to the first BS. The method comprises receiving, from a plurality of UEs wirelessly connected to the first BS and from the first UE, power measurements performed on signals received from neighboring BSs. The method further comprises determining correlation values between the power measurements received from the first UE and the power measurements received from individual of the plurality of UEs by comparing a level of the power measurements of the first UE and a level of the power measurements of individual of the plurality of UEs, which power measurements are performed on signals received from the same neighboring BS. The method further comprises determining neighboring UEs for the first UE out of the plurality of UEs, based on the determined correlation values, and sending IDs of the determined neighboring UEs to the first UE.

According to another aspect, a method is provided performed by a UE in a wireless communication network including a first BS, the UE being wirelessly connected to the first BS. The method comprises sending to the first BS power measurements performed on signals received from neighboring BSs, and receiving, from the first BS, IDs of determined neighboring UEs, the neighboring UEs being determined by the first BS based on determined correlation values between the power measurements received from the UE and power measurements received from individual of a plurality of UEs wirelessly connected to the first BS.

According to another aspect, a system of network nodes is provided operable in a wireless communication network for finding neighboring UEs with which a first UE may be able to communicate directly. The system includes a first BS, the first UE being wirelessly connected to the first BS. The system comprises a processor and a memory, said memory containing instructions executable by said processor, whereby the system is operative for receiving, from a plurality of UEs wirelessly connected to the first BS and from the first UE, power measurements performed on signals received from neighboring BSs. Said memory further contains instructions executable by said processor, whereby the system is operative for determining correlation values between the power measurements received from the first UE and the power measurements received from individual of the plurality of UEs by comparing a level of the power measing instructions executable by said processor, whereby the UE is operative for sending to the first BS power measurements performed on signals received from neighboring BSs, and receiving, from the first BS, IDs of determined neighboring UEs to the UE, the neighboring UEs being determined by the first BS based on determined correlation values between the power measurements received from the UE and power measurements received from individual of a plurality of UEs wirelessly connected to the first BS.

According to other aspects, computer programs and computer program products are also provided, the details of which will be described in the claims and the detailed description.

The above method and apparatus may be configured and implemented according to different optional embodiments.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to facilitate neighbor discovery for a D2D-enabled UE. In other words, a solution is provided that improves the process of a first D2D-enabled UE to discover neighboring D2D-enabled UEs with which it can start to communicate directly (D2D-communication). The basic concept of this solution is to use power measurements that are already performed in the network today but used for other purposes. Today, a UE is instructed to receive and measure signal strength on pilot signals transmitted by neighboring base stations, BS, defined in a neighbor cell list, NCL. The UE is also instructed to transmit the values of the measured signal strengths to its serving BS. Also, each UE and each BS have a unique local and/or global identification, ID. Since each BS and each UE have a unique ID, the serving BS knows from which UE each measured value comes and for which neighboring BS it is reported. Therefore, the measurement values from different UEs can be organized depending on to which neighboring BS the value relates.

The inventors have then found out that the measurement values relating to the same neighboring BS for two UEs that are in the vicinity of each other are highly correlated. Therefore, by analyzing the correlation of measurement values from two UEs, an estimation of the distance between two UEs can be determined. The closer the two UEs are to each other, the higher the correlation. The inventors have then developed a method in which the measurement values are organized and sorted into power vectors, one vector for each reporting UE. In each power vector, the measurement values are sorted in a BS order, so that measurement values for the same BS are placed in the same position for each power vector. A correlation metric is then calculated between two vectors as an estimation of the distance between two UEs. The individual correlation metrics may then be compared with a neighbor threshold. The UEs that have a correlation metric above the neighbor threshold are considered to be neighbors, while the UEs that have a correlation metric below the threshold are considered not to be neighbors. Such a process can be repeated for all served UEs, building a pool of neighbor UEs for each UE, in other words, a cluster of UEs centered on a first UE, for neighbors to the first UE. The IDs of the UEs in the pool of neighbor UEs may be stored in the BS. The IDs of the UEs in the pool may then be provided to the first UE, for example on request from the first UE. The first UE then has a limited set of UEs which are more likely to be able for D2D communication in the cell and the first UE can in an efficient way evaluate real channel conditions for establishing a D2D link with a suitable UE.

Figure 1:
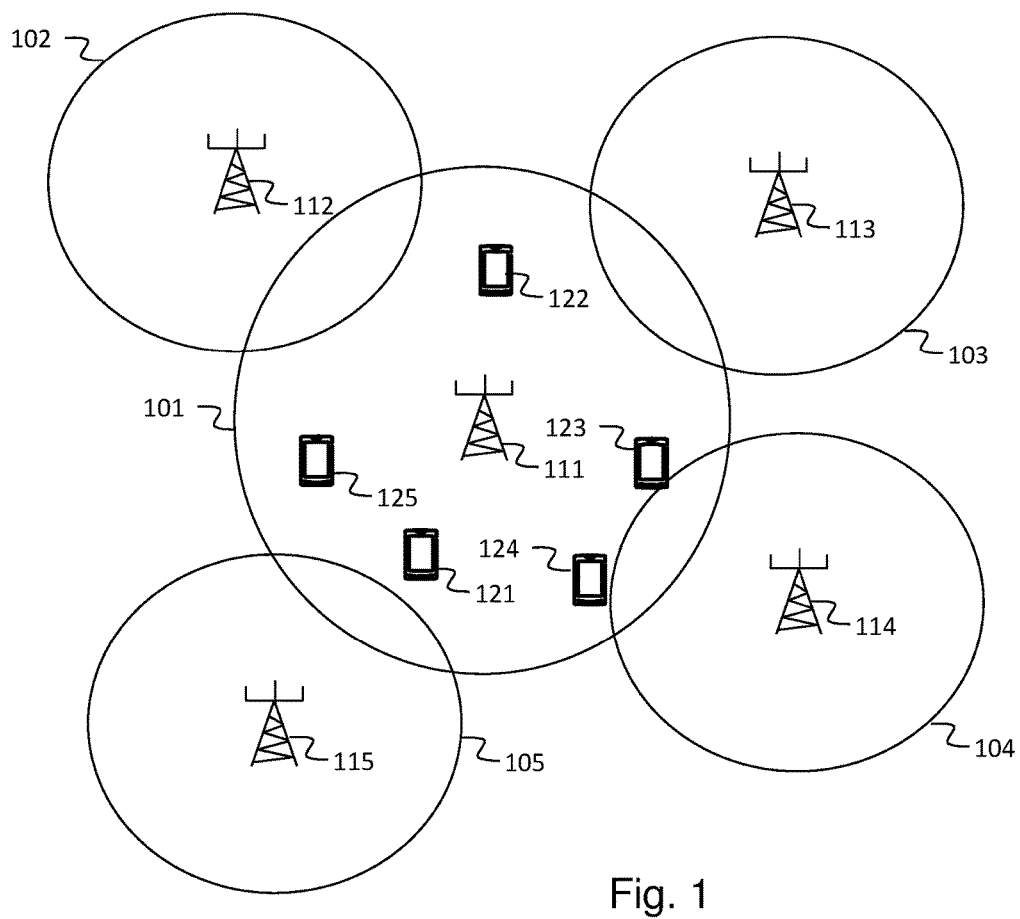
FIG. 1 is a block diagram of a communication network showing a possible communication scenario in which the present invention may be used.

FIG. 1 shows an example of wireless communication system in which the present invention may be used. The exemplary communication system comprises a first BS 111 providing wireless communication to UEs being in a geographical area of a first cell 101, and four further BSs, 112, 113, 114 and 115, each BS providing wireless communication to UEs being in a coverage area of a respective cell 102, 103, 104 and 105. In the first cell 101 there are in this exemplary scenario five UEs 121, 122, 123, 124 and 125. All five UEs are instructed by its serving BS 111 to perform power measurements on pilot signals sent from the BSs 112, 113, 114, 115 being neighbors to the serving BS 111. The neighboring BSs may be defined in a neighbor cell list of the first BS 111.

Figure 2:
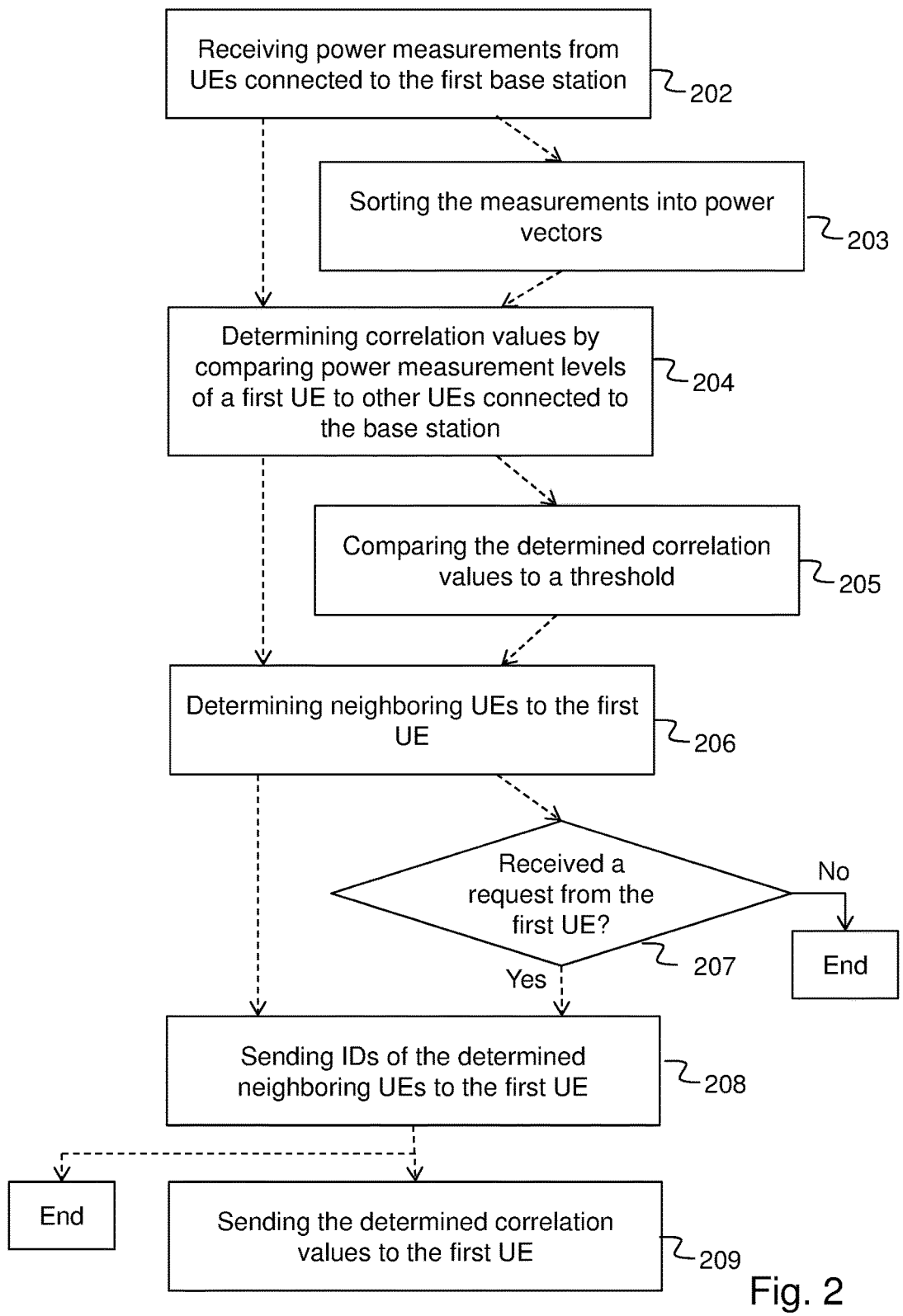
FIG. 2 is a flow chart illustrating a method in a network node, according to possible embodiments.

An embodiment of a method of the invention will now be described when it is used on the exemplary system of FIG. 1 with the exemplary scenario of the five UEs residing in the system of FIG. 1. The method is shown in FIG. 2. Described is a method performed by a system of network nodes in a wireless communication network, for finding neighboring UEs with which a first UE 121 may be able to communicate directly. The system of network nodes includes a first BS 111. The first UE 121 is wirelessly connected to the first BS 111. The method comprises receiving 202, from a plurality of UEs 122, 123, 124, 125 wirelessly connected to the first BS 111 and from the first UE 121, power measurements performed on signals received from neighboring BSs 112, 113, 114, 115. The method further comprises determining 204 correlation values between the power measurements received from the first UE and the power measurements received from individual of the plurality of UEs by comparing a level of the power measurements of the first UE and a level of the power measurements of individual of the plurality of UEs, which power measurements are performed on signals received from the same neighboring BS. The method further comprises, determining 206, based on the determined correlation values, neighboring UEs for the first UE, out of the plurality of UEs, and sending 208 IDs of the determined neighboring UEs to the first UE.

The system of network nodes may comprise a cloud solution in which functionality is spread over a plurality of network nodes. The system of network nodes may also be only the first BS 111 or a group composed by the first BS and neighboring BSs. The UE may be any kind of device for communicating wirelessly in a wireless network, such as a mobile phone, a laptop, a palmtop, a machine to machine, M2M, device etc. To communicate directly between two UEs signifies D2D communication, i.e. communicating without passing through a BS. Neighboring BSs signifies BSs in the vicinity of the first BS, for example BSs defined in a neighboring cell list stored for example at the first BS and supplied to the plurality of UEs and to the first UE by the first BS. The power measurements which levels are compared are the power measurements received from the first UE and the power measurements received from individual of the plurality of UEs, those power measurements that are related to the same neighboring BS. In other words, in a non-limiting example where there are in total 3 BSs, the first UE performs second power measurements on signals received from neighboring BS 2 and third measurements on signals received from neighboring BS 3. Further, a second UE and a third UE (which both are included in the term "the plurality of UEs") also performs second measurements on signals received from neighboring BS 2 and third measurements on signals received from BS 3. Thereafter, in the correlation step, the level of the second measurements of the first UE are compared to the level of the second measurements of the second UE, and also the level of the third measurements of the first UE are compared to the level of the third measurements of the second UE. In a similar manner, the level of the second measurements of the first UE are compared to the level of the second measurements of the third UE, and also the level of the third measurements of the first UE are compared to the level of the third measurements of the third UE.

By such a solution it is possible to sort out a number of UEs out of the whole number of UEs in a cell that are positioned closer to the first UE and therefore are more plausible to be able to communicate with directly (D2D communication). Tests have shown that by such a method, the total number of tries for detecting D2D communication able UEs for the first UE is lowered significantly compared to if D2D communication is tried with each of the other UEs in the cell. This lowers the signaling load on the air interface in the cell covered by the first BS significantly. Further, since the method uses power measurements already sent by the UEs to the first BS today for e.g. handover purposes, the communication resources of the UEs are not significantly loaded by this solution.

According to an embodiment, the method may further comprise sorting 203 the values of the received measurements into power vectors, one power vector for each of the plurality of UEs, and one power vector for the first UE, the power vectors each comprising the values of the power measurements performed by one UE. Further, the determining 204 of correlation values comprises comparing the values of the power vector of the first UE with the values of the power vectors of individual of the plurality of UEs.

The values of the received measurements of the individual power vectors may be sorted such that the values of measurements performed on signals received from the same BS are positioned on the same position in the vector. E.g. values of measurements of signals from a first neighboring BS are placed in a first position of each vector; values of measurements of signals from a second neighboring BS are placed in a second position of each vector, etc. Thereby, it is easy to determine correlation values between comparable power measurement values. If the power vectors are arranged as rows in a matrix, the columns in the matrix would show comparable values.

According to another embodiment, the method may further comprise comparing 205 the determined correlation values to a correlation value threshold. Further, the determined 206 neighboring UEs are the UEs that have a correlation value above the correlation value threshold. Thereby, a limited number of neighboring UEs that are the best candidates for D2D communication can be sorted out. Further, tests may be performed in the network to determine a best possible value for the correlation value threshold in order to minimize the percentage of false neighbors.

According to another embodiment, the method may further comprise receiving 207 a request from the first UE for the IDs of the determined neighboring UE. Further, the IDs of the determined neighboring UEs may only be sent 208 to the first UE in response to receiving such a request. By only sending the IDs of the determined UEs in the case when the first UE requests them will lower the risk of sending unnecessary messages, which will lower the traffic in the cell.

According to another embodiment, the method may further comprise sending 209 the determined correlation values of the determined neighboring UEs to the first UE. The correlation values may be sent in the same message as the IDs. By sending the correlation values as well as the neighboring UEs IDs, the first UE can also see the ranking within the determined neighboring UEs. If this ranking is used, the number of tries for the first UE to find a reliable path for D2D communication may be shortened even more.

According to another embodiment, the correlation values are determined 204 by a normalized scalar product between values of two comparable power vectors.

Figure 3:
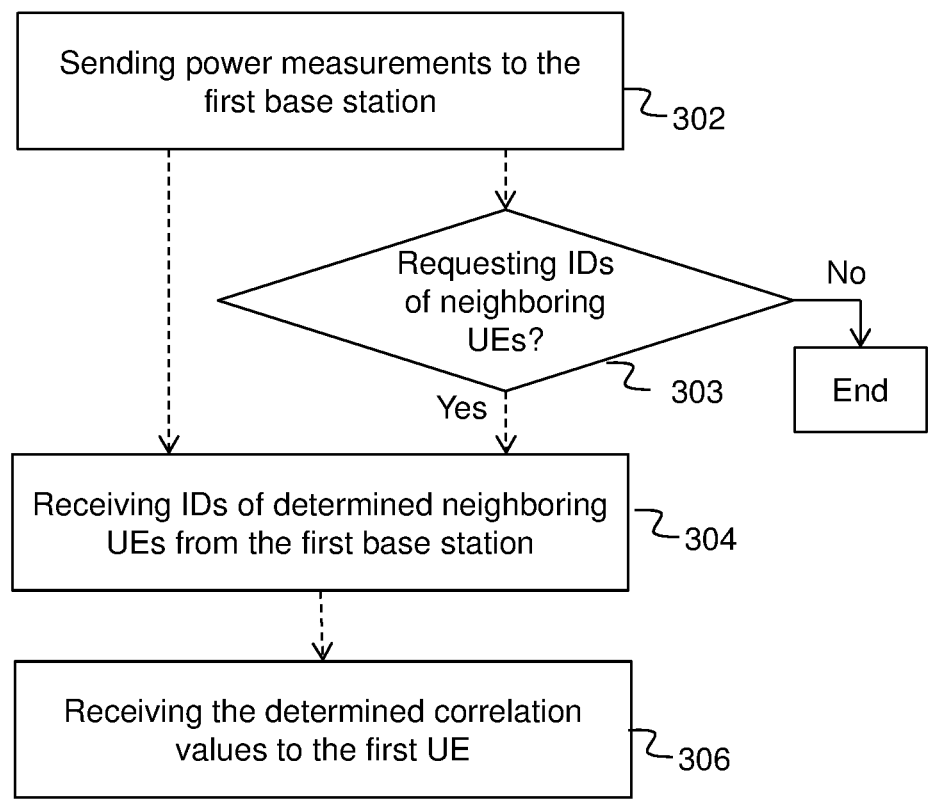
FIG. 3 is another flow chart illustrating a method in a user equipment, according to possible embodiments

According to another embodiment, as described in FIG. 3, a method is provided performed by a UE 121 in a wireless communication network including a first BS 111, the UE being wirelessly connected to the first BS 111. The method comprises sending 302 to the first BS 111 power measurements performed on signals received from neighboring BSs 112, 113, 114, 115 and receiving 304, from the first BS 111 identities, IDs, of determined neighboring UEs, the neighboring UEs being determined by the first BS based on determined correlation values between the power measurements received from the UE 121 and power measurements received from individual of a plurality of UEs 122, 123, 124, 125 wirelessly connected to the first BS 111.

Thereby, the UE is informed by the first BS which other UEs that are positioned close to the UE. The UE can then try to initiate D2D communication with those other UEs first instead of to all UEs in the cell, or in any random order. Thereby, communication resources at the UE are saved.

According to an embodiment, the method further comprises requesting 303 from the first BS, the IDs of the determined neighboring UEs, and only receiving 304 the IDs of the determined neighboring UEs in response to such a request.

According to another embodiment, the method further comprises receiving 306, from the first BS 111, the determined correlation values of the determined neighboring UEs.

In the following, an embodiment for collecting neighbor cell list power measurements is described. Any UE while operating in structured networks, as the case of cellular systems such as LTE, LTE-Advanced, LTE-A, GSM, W-CDMA, and High Speed Downlink Packet Access, HSDPA, is instructed to perform a set of measurements. One of the very basic of those measurements is the value of received power from its serving BS. Furthermore, UEs are also instructed to perform power measurements on signals, such as pilot signals of neighboring BSs, and report the values of the performed power measurements back to their serving BS. This procedure of collecting power measurements may be used at connection establishment and for e.g. handover reasons. Moreover, each BS knows its neighbor cells which are stored in a list, commonly described as Neighbor Cell List, NCL, or monitored set.

In the following, an embodiment for sorting the collected power measurement values into power vectors is described. Each UE has reported different power values for the neighboring BSs and since both UE ID and BS/cell IDs are assumed to be unique, it is easy for the serving BS to arrange those values in a specific order, like shown in the matrix below:

$$P = \begin{bmatrix} & BS_1 & BS_2 & \ldots & BS_B \\ UE_1 & P_{1,1} & P_{1,2} & \ldots & P_{1,B} \\ UE_2 & P_{2,1} & P_{2,1} & \ldots & P_{2,B} \\ \ldots & \ldots & \ldots & \ldots & \ldots \\ UE_U & P_{U,1} & P_{U,2} & \ldots & P_{U,B} \end{bmatrix}$$

As such, B is the total number of BSs that are in NCL, and U is the total number of UEs in the serving BS service area. With this representation, each row represents a power vector, where $P_{u,b}$ (u=1 ... U, b=1 ... B) is the power received by $UE_u$ from $BS_b$. In the case of LTE or LTE-Advanced, LTE-A, networks, the power measurement may be e.g. the Reference Signal Received Power, RSRP, or the Reference Signal Received Quality, RSRQ, or the Receive Signal Strength Indication, RSSI. Notice that whenever the received power for a specific BS cannot be measured by a certain UE, due to any particular reason, a standard value (e.g., zero) can be used to fill the corresponding gap in the power vector. Also, for LTE or LTE-A networks, the ID of each UE can be obtained with e.g. a Demodulation Reference Signal, DMRS, which is transmitted in the uplink direction, and the cell ID with the Physical Cell ID, PCI. Finally, in order not to polarize or bias the results, the received power from the serving BS shall be removed, i.e., set to zero, from the power vector of each UE or quite simply not be inserted from the beginning.

In the following, an embodiment for building a neighborhood matrix based on the power vectors is described. When the power values are organized in the form of power vectors, a correlation metric is used to determine the correlation between the power values of two power vectors. Further, a correlation threshold, TH, may be defined. When the correlation is above the threshold TH, the UEs of the two correlated power vectors are considered neighbors because their set of measurements is very similar and, therefore, it is likely to happen that they are in physical proximity. When the correlation is below the threshold TH, the UEs are not considered as neighbors because their set of measurements is not similar and, therefore, it is likely to happen that they are far away from each other. Further, the results of the correlation metric may be normalized.

In the following, a possible embodiment for determining the cross-correlation between power vectors is described. A possible metric is defined as:

$$\rho_{x,y} = \left\langle \frac{x}{\|x\|} \middle| \frac{y}{\|y\|} \right\rangle$$

in which $\rho_{x,y}$ is the normalized cross correlation value for power vectors x and y, i.e., x,y are the contents of two different rows of matrix $$P(x,y \in [P_{UE_1} P_{UE_2} \ldots P_{UE_U}] \wedge x \neq y).$$

Also, $\langle .|. \rangle$ is the scalar product and $\|.\|$ is the $L^2$ norm, defined as:

$$\|v\| = \sqrt{\sum_{k=1}^{K} |v_k|^2}, \text{ with } v = [\begin{array}{cccc} v_1 & v_2 & \ldots & v_K \end{array}]^T \wedge v \in \{x, y\}$$

Since x and y are composed by non-negative quantities, $\rho_{x,y}$ will range between 0, signifying non-correlation and 1, signifying very high correlation. The threshold, TH, set between 0 and 1 is imposed, against which different metric values $\rho_{x,y}$ are compared to determine whether the correlated UEs are neighbors or not.

Finally, a neighborhood matrix may be constructed and stored in each BS as follows: If $\rho_{x,y}$ is above the threshold ($\rho_{x,y}$>TH), $UE_x$ and $UE_y$ are tagged as neighbors, and $\rho_{x,y}$ is placed in the corresponding (x,y) and (y,x) indexes (note that $\rho_{x,y}=\rho_{y,x}$). Else, $UE_x$ and $UE_y$ are tagged as non-neighbors, and a 0 is placed in the corresponding (x,y) and (y,x) indexes.

As a result, the corresponding neighborhood matrix may look like:

$$\Omega = \begin{bmatrix} & UE_1 & UE_2 & \ldots & UE_U \\ UE_1 & 0 & \omega_{1,2} & \ldots & \omega_{1,U} \\ UE_2 & \omega_{2,1} & 0 & \ldots & \omega_{2,U} \\ \ldots & \ldots & \ldots & \ldots & \ldots \\ UE_U & \omega_{U,1} & \omega_{U,2} & \ldots & 0 \end{bmatrix}$$

with: $\omega_{x,y} = \begin{cases} \rho_{x,y}, & \text{when } x \neq y \wedge \rho_{x,y} > TH \\ 0, & \text{when } x = y \vee \rho_{x,y} \leq TH \end{cases}$ Note that, the square matrix $\Omega$ is symmetric, thus only the lower or upper triangles may be used, e.g., for saving storage space.

The proposed normalized cross correlation metric defined above and expressed as the normalized scalar product between two power vectors is one possible correlation metric, but other correlation metrics might be used. Such correlation metrics can be easily found in literature. One example is the Pearson's correlation coefficient. Similarly, instead of storing the real correlation value in the matrix $\Omega$, a binary matrix $\Omega$ may be stored in which a 1 is stored whenever $\rho_{x,y}$>TH and otherwise a 0 is stored. However, by storing the real values, they might be used to sort the list of candidate neighbors of a UE, e.g. highest correlation first, and that information can be used to improve routing protocols in multicast or broadcast scenarios. Additionally, instead of setting the value to 0 when the power measurement is unavailable, other reference value might be used, e.g., the maximum long-term fading value towards the first ring of interfering cells. Furthermore, this value can be controlled in such a way that it limits the number of false neighbors and maximizes the number of real neighbors.

In a possible next step, the built neighborhood matrix is stored at the BS and the corresponding row or the full matrix is delivered to UEs upon request. Moreover, to ensure that two D2D-capable UEs are real neighbors, the D2D channel is to be evaluated before commencing a D2D communication. This may be performed by sending signals directly between the D2D-capable UEs that were found from the above calculation to be neighbors and to evaluate these received signal strength in the respective UE to ensure that the real channel condition is good enough.

Figure 4:
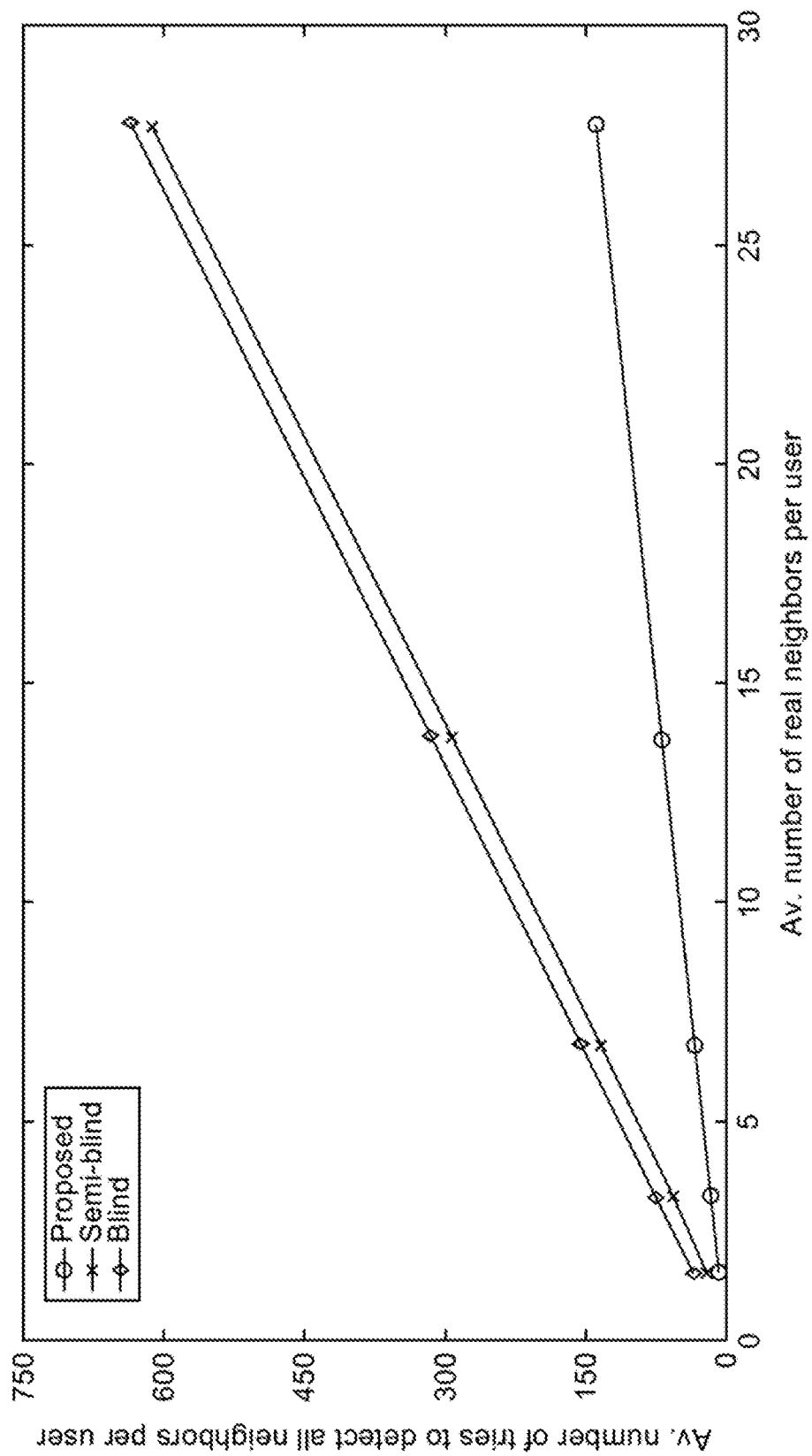
FIGS. 4-5 are graphs illustrating effects of embodiments of the present invention compared to prior art methods.
Figure 5:
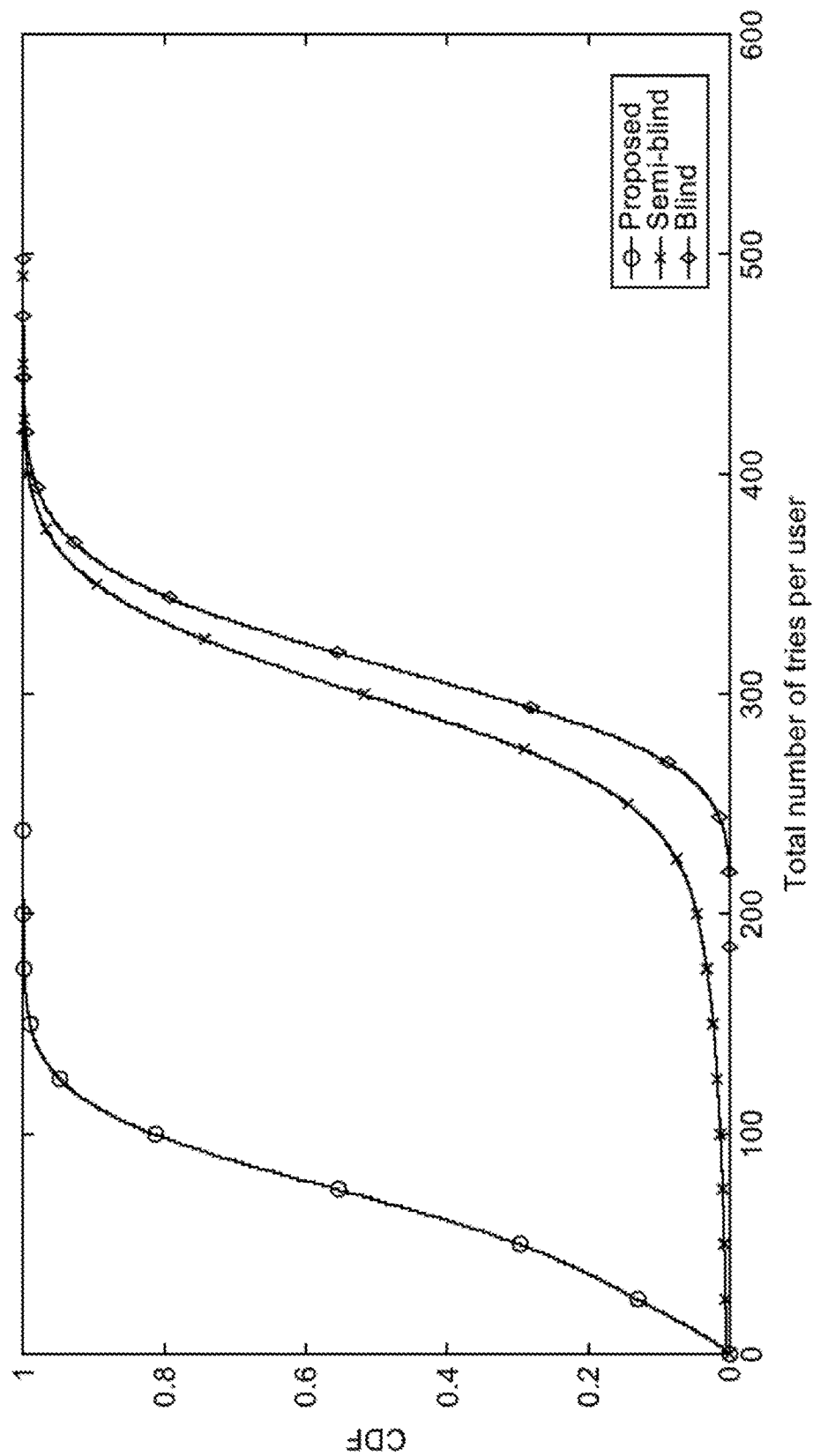

FIGS. 4 and 5 show results of tests performed for three different methods of finding D2D-enabled neighboring UEs with which a UE can communicate. The methods called "blind" and "semi-bind" use other methods where each UE does not know about which UEs to contact in the network but sends beacon signals in the cell for other UEs to respond to. In the "semi-bind" method, each UE knows the number of UE neighbors but does not know their IDs. In the "blind" method, the first UE only knows the number of UEs in the cell and not their IDs. In the "proposed" method, neighboring UEs have been defined using the method of the invention. Consequently, here the first UE has only contacted the defined neighboring UEs trying to set up a D2D connection. In other words, here each UE has the full information of its neighbors (i.e., total number of neighbors and their IDs); and in this method there are not false detections. For the particular case of the figures presented herein, the correlation threshold, TH, was fixed to 0.75. Further, in FIG. 5 the test used 64 UEs per cell.

As could be seen from the results of FIGS. 4 and 5, the proposed method clearly outperforms the two other methods (semi-bind and blind): it reduces the time to detect all neighbors (FIG. 5) and its complexity (i.e., the number of tries required to detect all neighbors, when the number of neighbors increases) is considerable reduced, which can be observed in the slope of the straight line in FIG. 4. "CDF" in FIG. 5 stands for Cumulative Distribution Function.

Figure 6:
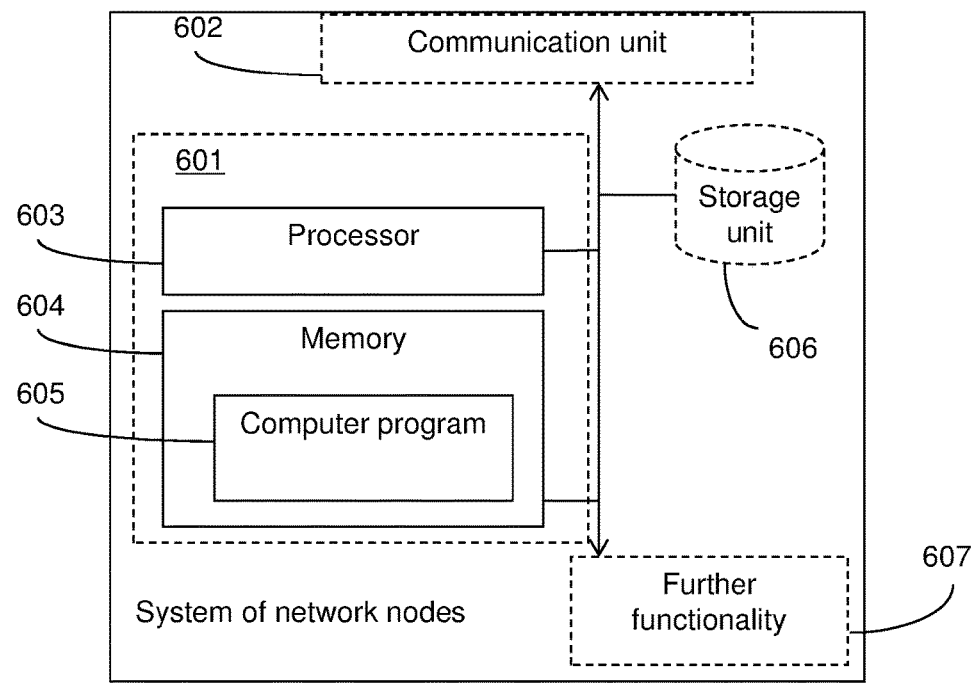
FIGS. 6-7 are block diagrams illustrating a network node in more detail, according to possible embodiments.

FIG. 6 describes an embodiment of a system of network nodes operable in a wireless communication network for finding neighboring UEs with which a first UE 121 may be able to communicate directly, the system including a first BS 111, the first UE being wirelessly connected to the first BS. The system comprises a processor 603 and a memory 604. The memory contains instructions executable by said processor, whereby the system is operative for receiving, from a plurality of UEs 122, 123, 124, 125 wirelessly connected to the first BS 111 and from the first UE 121, power measurements performed on signals received from neighboring BSs 112, 113, 114, 115. The memory 604 further contains instructions executable by said processor, whereby the system is operative for determining correlation values between the power measurements received from the first UE and the power measurements received from individual of the plurality of UEs by comparing a level of the power measurements of the first UE and a level of the power measurements of individual of the plurality of UEs, which power measurements are performed on signals received from the same neighboring BS, and, based on the determined correlation values, determining neighboring UEs for the first UE, out of the plurality of UEs, and sending identities, IDs, of the determined neighboring UEs to the first UE.

According to an embodiment, said memory 604 may further contain instructions executable by said processor 603, whereby the system is operative for sorting the received measurements into power vectors, one power vector for each of the plurality of UEs, and one power vector for the first UE, the power vectors each comprising the values of the power measurements performed by one UE. Further, the determining of correlation values may comprise comparing the values of the power vector of the first UE with the values of the power vectors of individual of the plurality of UEs.

According to another embodiment, said memory 604 may further contain instructions executable by said processor 603, whereby the system is operative for comparing the determined correlation values to a correlation value threshold, and wherein the determined neighboring UEs are the UEs that have a correlation value above the correlation value threshold.

According to another embodiment, said memory 604 may further contain instructions executable by said processor 603, whereby the system is operative for receiving a request from the first UE for the IDs of the determined neighboring UE, and only sending the IDs of the determined neighboring UEs to the first UE in response to receiving such a request.

According to another embodiment, said memory 604 may further contain instructions executable by said processor 603, whereby the system is operative for sending the determined correlation values of the determined neighboring UEs to the first UE. According to another embodiment, the system of network nodes is a base station.

The system of network nodes may further comprise a communication unit 602, which may be considered to comprise conventional means for communicating from and/or to the other nodes in the network, such as the UEs. The conventional communication means may include at least one transmitter and at least one receiver. The system of network nodes may further comprise one or more storage units 606 and further functionality 607 useful for the system of network nodes to serve its purpose as system of network nodes, e.g. base station. The instructions executable by said processor may be arranged as a computer program 605 stored in said memory 604. The processor 603 and the memory 604 may be arranged in an arrangement 601. The arrangement 601 may alternatively be a micro processor and adequate software and storage therefore, a Programmable Logic Device, PLD, or other electronic component(s)/processing circuit(s) configured to perform the actions, or methods mentioned above.

The computer program 605 may comprise computer readable code means, which when run in the system of network nodes causes the system of network nodes to perform the steps described in any of the described embodiments. The computer program may be carried by a computer program product connectable to the processor. The computer program product may be the memory 604. The memory 604 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 604. Alternatively, the computer program may be stored on a server or any other entity connected to the communication network to which the system of network nodes has access via its communication unit 602. The computer program may then be downloaded from the server into the memory 604.

Figure 7:
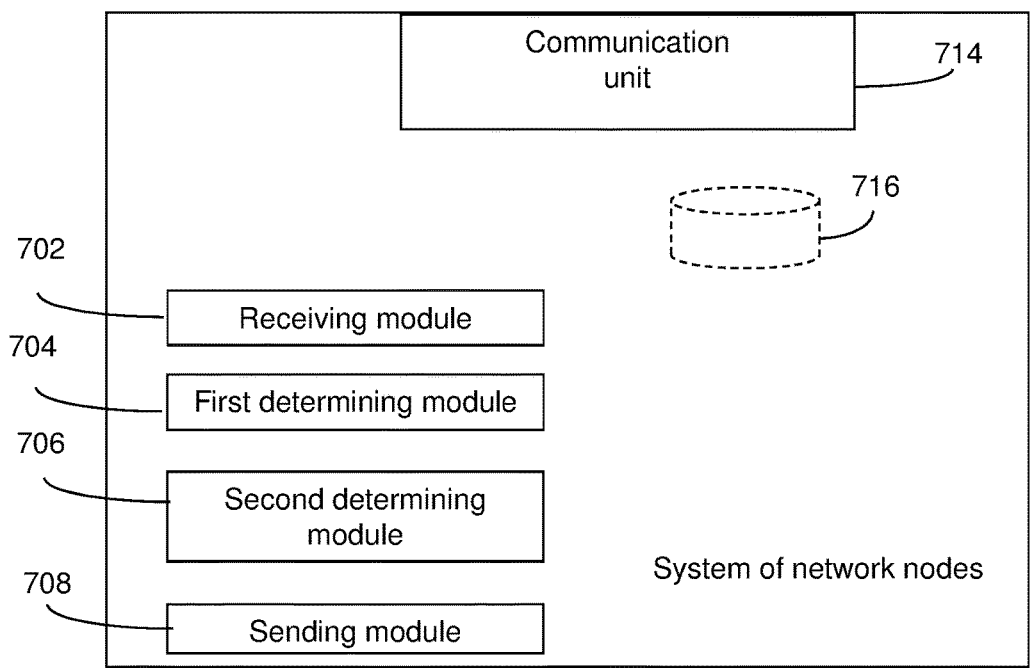

FIG. 7 describes another embodiment of a system of network nodes operable in a wireless communication network for finding neighboring UEs with which a first UE may be able to communicate directly. The system includes a first BS and the first UE is wirelessly connected to the first BS. The system comprises a receiving module 702 for receiving, from a plurality of UEs wirelessly connected to the first BS and from the first UE, power measurements performed on signals received from neighboring BSs. The system further comprises a first determining module 704 for determining correlation values between the power measurements received from the first UE and the power measurements received from individual of the plurality of UEs by comparing a level of the power measurements of the first UE and a level of the power measurements of individual of the plurality of UEs, which power measurements are performed on signals received from the same neighboring BS. The system further comprises a second determining module 706 for determining neighboring UEs for the first UE, out of the plurality of UEs, based on the determined correlation values, and a sending module 708 for sending identities, IDs, of the determined neighboring UEs to the first UE. The system may further comprise a communication unit 714 similar to the communication unit 602 of FIG. 6 and a storage unit 716 similar to the storage unit of FIG. 6.

Figure 8:
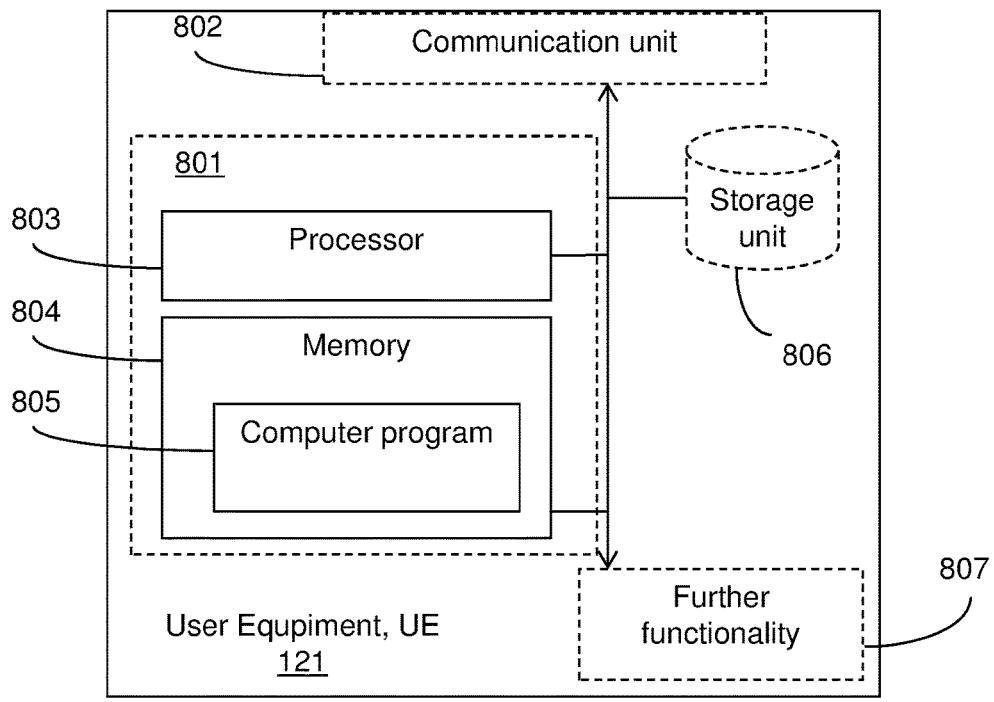
FIGS. 8-9 are block diagrams illustrating a UE in more detail, according to possible embodiments.

FIG. 8 describes an embodiment of a UE 121 operable in a wireless communication network including a first BS 111, the UE being wirelessly connected to the first BS 111. The UE 121 comprises a processor 803 and a memory 804, said memory containing instructions executable by said processor, whereby the UE is operative for sending to the first BS 111 power measurements performed on signals received from neighboring BSs 112, 113, 114, 115, and receiving, from the first BS 111 IDs of determined neighboring UEs to the UE 121, the neighboring UEs being determined by the first BS based on determined correlation values between the power measurements received from the UE 121 and power measurements received from individual of a plurality of UEs 122, 123, 124, 125 wirelessly connected to the first BS 111.

According to an embodiment, said memory 804 further contains instructions executable by said processor 803, whereby the UE is operative for requesting from the first BS, the IDs of the determined neighboring UEs, and only receiving the IDs of the determined neighboring UEs in response to such a request.

According to another embodiment, said memory 804 further contains instructions executable by said processor 803, whereby the UE is operative for receiving, from the first BS 111, the determined correlation values of the determined neighboring UEs.

The UE 121 may further comprise a communication unit 802, which may be considered to comprise conventional means for communicating from and/or to the other nodes in the network, such as the first BS 111. The conventional communication means may include at least one transmitter and at least one receiver. The UE may further comprise one or more storage units 806 and further functionality 807 useful for the UE to serve its purpose as UE, such as a battery. The instructions executable by said processor may be arranged as a computer program 805 stored in said memory 804. The processor 803 and the memory 804 may be arranged in an arrangement 801. The arrangement 801 may alternatively be a micro processor and adequate software and storage therefore, a Programmable Logic Device, PLD, or other electronic component(s)/processing circuit(s) configured to perform the actions, or methods mentioned above.

The computer program 805 may comprise computer readable code means, which when run in the UE causes the UE to perform the steps described in any of the described embodiments. The computer program may be carried by a computer program product connectable to the processor. The computer program product may be the memory 804. The memory 804 may be realized as for example a RAM, ROM, or an EEPROM. Further, the computer program may be carried by a separate computer-readable medium, such as a CD, DVD or flash memory, from which the program could be downloaded into the memory 804. Alternatively, the computer program may be stored on a server or any other entity connected to the communication network to which the system of network nodes has access via its communication unit 802. The computer program may then be downloaded from the server into the memory 804.

Figure 9:
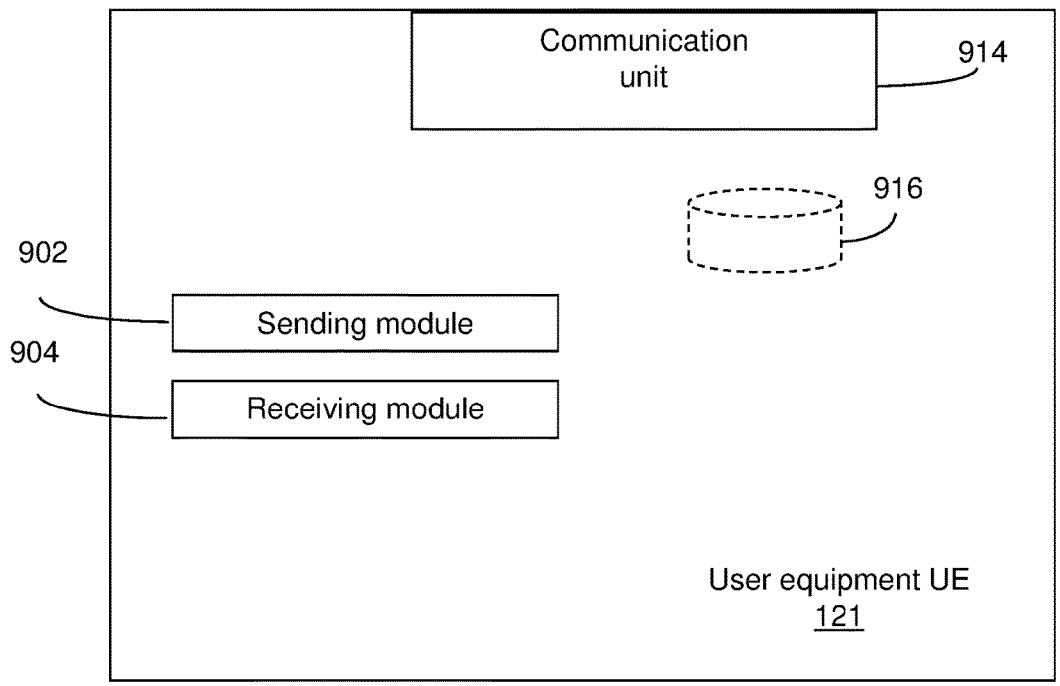

FIG. 9 describes another embodiment of a UE 121 operable in a wireless communication network including a first BS 111, the UE being wirelessly connected to the first BS. The UE 121 comprises a sending module 902 for sending to the first BS 111 power measurements performed on signals received from neighboring BSs 112, 113, 114, 115, and a receiving module 904 for receiving, from the first BS 111, IDs of determined neighboring UEs to the UE 121, the neighboring UEs being determined by the first BS based on determined correlation values between the power measurements received from the UE 121 and power measurements received from individual of a plurality of UEs 122, 123, 124, 125 wirelessly connected to the first BS 111. The UE may further comprise a communication unit 914 similar to the communication unit 802 of FIG. 8 and a storage unit 716 similar to the storage unit of FIG. 8. The UE may also comprise further functionality such as a battery.

Note that the methods and apparatuses described above might as well be used for other system apart from cellular systems, such as WLAN and Worldwide Interoperability for Microwave Access (WiMAX), since most systems already dispose of methods to measure the received power, which is used, at least, during connection establishment.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby.

The invention claimed is:

1. A method performed by a system of network nodes in a wireless communication network, for finding neighboring user equipments, UEs, with which a first UE may be able to communicate directly, the system of network nodes including a first base station, BS, the first UE being wirelessly connected to the first BS, the method comprising:
receiving, from a plurality of UEs wirelessly connected to the first BS and from the first UE, power measurements performed on signals received from neighboring BSs;
determining correlation values between the power measurements received from the first UE and the power measurements received from individual of the plurality of UEs by comparing a level of the power measurements of the first UE and a level of the power measurements of individual of the plurality of UEs, which power measurements are performed on signals received from the same neighboring BS;
based on the determined correlation values, determining neighboring UEs for the first UE, out of the plurality of UEs, and
sending identities, IDs, of the determined neighboring UEs to the first UE.

2. The method according to claim 1, further comprising:
sorting the received measurements into power vectors, one power vector for each of the plurality of UEs, and one power vector for the first UE, the power vectors each comprising the values of the power measurements performed by one UE, and
wherein the determining of correlation values comprises comparing the values of the power vector of the first UE with the values of the power vectors of individual of the plurality of UEs.

3. The method according to claim 2, wherein the correlation values are determined by a normalized scalar product between values of two comparable power vectors.

4. The method according to claim 1, further comprising:
comparing the determined correlation values to a correlation value threshold, and wherein the determined neighboring UEs are the UEs that have a correlation value above the correlation value threshold.

5. The method according to claim 1, further comprising:
receiving a request from the first UE for the IDs of the determined neighboring UEs, and only sending the IDs of the determined neighboring UEs to the first UE in response to receiving such a request.

6. The method according to claim 1, further comprising:
sending the determined correlation values of the determined neighboring UEs to the first UE.

7. A method performed by a user equipment, UE, in a wireless communication network including a first base station, BS, the UE being wirelessly connected to the first BS, the method comprising:
sending to the first BS power measurements performed on signals received from neighboring BSs;
receiving, from the first BS identities, IDs, of determined neighboring UEs, the neighboring UEs being determined by the first BS based on determined correlation values between the power measurements received from the UE and power measurements received from individual of a plurality of UEs wirelessly connected to the first BS.

8. The method according to claim 7, further comprising:
requesting from the first BS, the IDs of the determined neighboring UEs, and only receiving the IDs of the determined neighboring UEs in response to such a request.

9. The method according to claim 7, further comprising:
receiving, from the first BS, the determined correlation values of the determined neighboring UEs.

10. A system of network nodes operable in a wireless communication network for finding neighboring user equipment, UEs, with which a first UE may be able to communicate directly, the system including a first base station, BS, the first UE being wirelessly connected to the first BS, the system comprising a processor and a memory, said memory containing instructions executable by said processor, whereby the system is operative for:
receiving, from a plurality of UEs wirelessly connected to the first BS and from the first UE, power measurements performed on signals received from neighboring BSs;
determining correlation values between the power measurements received from the first UE and the power measurements received from individual of the plurality of UEs by comparing a level of the power measurements of the first UE and a level of the power measurements of individual of the plurality of UEs, which power measurements are performed on signals received from the same neighboring BS;
based on the determined correlation values, determining neighboring UEs for the first UE, out of the plurality of UEs, and
sending identities, IDs, of the determined neighboring UEs to the first UE.

11. The system of network nodes according to claim 10, wherein said memory further contains instructions executable by said processor, whereby the system is operative for:
sorting the received measurements into power vectors, one power vector for each of the plurality of UEs, and one power vector for the first UE, the power vectors each comprising the values of the power measurements performed by one UE, and
wherein the determining of correlation values comprises comparing the values of the power vector of the first UE with the values of the power vectors of individual of the plurality of UEs.

12. The system of network nodes according to claim 10, wherein said memory further contains instructions executable by said processor, whereby the system is operative for:
comparing the determined correlation values to a correlation value threshold, and wherein the determined neighboring UEs are the UEs that have a correlation value above the correlation value threshold.

13. The system of network nodes according to claim 10, wherein said memory further contains instructions executable by said processor, whereby the system is operative for:
receiving a request from the first UE for the IDs of the determined neighboring UEs, and only sending the IDs of the determined neighboring UEs to the first UE in response to receiving such a request.

14. The system of network nodes according to claim 10, wherein said memory further contains instructions executable by said processor, whereby the system is operative for:
sending the determined correlation values of the determined neighboring UEs to the first UE.

15. The system of network nodes according to claim 10, wherein the system of network nodes is a base station.

16. A user equipment, UE, operable in a wireless communication network including a first base station, BS, the UE being wirelessly connected to the first BS, the UE comprising a processor and a memory, said memory containing instructions executable by said processor, whereby the UE is operative for:
sending to the first BS power measurements performed on signals received from neighboring BSs; and
receiving, from the first BS identities, IDs, of determined neighboring UEs to the UE, the neighboring UEs being determined by the first BS based on determined correlation values between the power measurements received from the UE and power measurements received from individual of a plurality of UEs wirelessly connected to the first BS.

17. The user equipment according to claim 16, wherein said memory further contains instructions executable by said processor, whereby the UE is operative for requesting from the first BS, the IDs of the determined neighboring UEs, and only receiving the IDs of the determined neighboring UEs in response to such a request.

18. The user equipment according to claim 16, wherein said memory further contains instructions executable by said processor, whereby the UE is operative for:
receiving, from the first BS, the determined correlation values of the determined neighboring UEs.

19. A computer program product comprising a non-transitory computer readable storage medium comprising a computer program comprising computer readable code, which when run in a system of network nodes operable in a wireless communication network, the system including a first base station, BS, and a first UE being wirelessly connected to the first BS, causes the system of network nodes to perform the following steps:

receiving, from a plurality of UEs wirelessly connected to the first BS and from the first UE, power measurements performed on signals received from neighboring BSs;

determining correlation values between the power measurements received from the first UE and the power measurements received from individual of the plurality of UEs by comparing a level of the power measurements of the first UE and a level of the power measurements of individual of the plurality of UEs, which power measurements are performed on signals received from the same neighboring BS;

based on the determined correlation values, determining neighboring UEs for the first UE, out of the plurality of UEs, and sending identities, IDs, of the determined neighboring UEs to the first UE.

20. A computer program product comprising a non-transitory computer readable storage medium comprising a computer program comprising computer readable code, which when run in a user equipment operable in a wireless communication network including a first base station, BS, and wherein the UE is wirelessly connected to the first BS, causes the UE to perform the following steps:

sending to the first BS, power measurements performed on signals received from neighboring BSs; and receiving from the first BS, identities, IDs, of determined neighboring UEs to the UE, the neighboring UEs being determined by the first BS based on determined correlation values between the power measurements received from the UE and power measurements received from individual of a plurality of UEs wirelessly connected to the first BS.

* * * * *